United States Patent [19]

Elvin

[11] 4,027,225
[45] May 31, 1977

[54] DC CONVERTOR

[75] Inventor: Sten Elvin, Vasteras, Sweden

[73] Assignee: Asea Aktiebolag, Vasteras, Sweden

[22] Filed: Oct. 17, 1975

[21] Appl. No.: 623,461

[30] Foreign Application Priority Data

Nov. 18, 1974 Sweden .............................. 7414425

[52] U.S. Cl. .............................. 321/10; 318/345 R; 323/77
[51] Int. Cl.² .......................................... H02M 1/14
[58] Field of Search ................... 307/105; 318/345; 321/2, 9 R, 10; 323/7, 17, 76, 77, 78; 333/79

[56] References Cited

UNITED STATES PATENTS

| | | |
|---|---|---|
| 2,710,938 | 6/1955 | Lee .................... 321/10 X |
| 2,730,667 | 1/1956 | Uhlmann .................. 333/79 X |
| 3,291,960 | 12/1966 | Folkhard et al. ................ 323/78 X |
| 3,308,311 | 3/1967 | Swanson .................. 321/10 X |
| 3,583,089 | 1/1976 | Maddox ................................ 323/17 |
| 3,710,284 | 1/1973 | Uhlmann .......................... 333/79 X |
| 3,745,440 | 7/1973 | Lord ................................ 321/2 X |
| 3,758,840 | 9/1973 | Oliver ........................ 321/2 |
| 3,859,542 | 1/1975 | Kennedy ........................ 307/105 X |

Primary Examiner—A. D. Pellinen
Attorney, Agent, or Firm—Watson, Cole, Grindle & Watson

[57] ABSTRACT

A convertor for supplying a load with direct voltage pulses of variable frequency includes input terminals for connection to a DC source and a main circuit, with a filter circuit connected between the input terminals and the main circuit. The filter circuit includes a capacitive parallel branch and a series inductor connected between one of the input terminals and the capacitive parallel branch. A resistor for reducing the Q-value of the filter circuit is connected in parallel with the series inductor. A second series inductor may be connected in series with the parallel connection of the first series inductor and the resistor. The first series inductor has an inductance which, at low current values, is larger than that of the second inductor.

3 Claims, 3 Drawing Figures

DC CONVERTOR

BACKGROUND OF THE INVENTION

1. Field of the Invention

The present invention relates to a DC convertor for supplying a load with direct voltage pulses with a variable frequency. The DC convertor has input terminals for connection to a DC supply network and comprises a filter circuit arranged between the input terminals and the main circuit of the convertor, said filter circuit comprising a capacitive parallel branch and a first series inductor between the input terminals and the capacitive parallel branch.

2. The Prior Art

FIG. 1 shows a known DC convertor for controlling the power to a DC motor M. It is fed from a direct voltage network with the voltage $U_N$ and the internal inductance $L_N$. It is connected to the network by means of the input terminals P and N, which, if the convertor is stationary, may be ordinary connecting terminals and, if the convertor is arranged in a vehicle, may consist of a pantograph or trolley pole. The convertor comprises a thyristor T provided with turn-off equipment and a freewheeling diode D. By periodic ignition and extinction of the thyristor T, the motor is supplied with direct voltage pulses. By varying the relation between the lengths of the conducting and non-conducting intervals of the thyristor, the average value of the direct voltage which is supplied to the motor can be controlled.

The DC convertor requires for its function a stiff supply voltage. Its input is therefore provided with a parallel capacitor C. This capacitor is normally necessary, especially in those cases where the convertor is mounted in a vehicle and is supplied by way of a contact line which has internal inductance.

As a rule a convertor of this type works with a variable pulse frequency. At the frequency values, inductance values and capacitance values occurring in practice, there is a risk that some working frequency may correspond to the resonance frequency of the circuit constituted by $L_N$ and C.

The current I of the DC convertor consists of current pulses with a certain pulse frequency. This current can be divided into a DC component $I^D$ and an AC component $I^{AC}$ with the same frequency as the pulse frequency (and a number of harmonics). At the resonance frequency of the circuit $L_N$ - C, the AC component $I_N^{AC}$ of the current drawn from the source will be very great (infinite if the circuit is free of losses), as well also as the alternating voltage component of the voltage across the capacitor C. This causes considerable drawbacks in the form of the danger of signal and tele-disturbances and deteriorated working conditions for the DC convertor.

In order to avoid these disadvantages, it is known to arrange a series inductor L in the DC convertor. Its inductance is then added to the network inductance $L_N$, and this results in a reduction of the resonance frequency. By making the inductance of L great, the resonance frequency can be made low. If then a lower limit is set to the working frequency of the DC convertor so that the working frequency always exceeds the resonance frequency by a certain margin, the above-mentioned problems of resonance are avoided.

However, this known circuit has considerable drawbacks. In a DC convertor the pulse length cannot in general be lower than a certain minimum value. The average voltage supplied to the motor M is proportional to the product of the pulse length and the pulse frequency. Since the pulse frequency in this known circuit cannot be reduced below a minimum value determined by the resonance frequency of the filter, the load voltage cannot be reduced below a certain least value. This means, for example, heavy jerks when starting a vehicle driven by an electric motor. It has proven to be impossible for practical and economic reasons to increase the inductance of L (and thus decrease the resonance frequency) to such an extent that these drawbacks are avoided, since L must then have very large dimensions.

SUMMARY OF THE INVENTION

The invention aims at providing a DC convertor in which it is possible to control the frequency and thus the load voltage right down to zero, without having the AC component of the current from the direct voltage source assume detrimentally high values.

BRIEF DESCRIPTION OF THE DRAWINGS

The invention will be described below with reference to the accompanying FIGS. 1 - 3.

DESCRIPTION OF THE PREFERRED EMBODIMENTS

Figure 1:
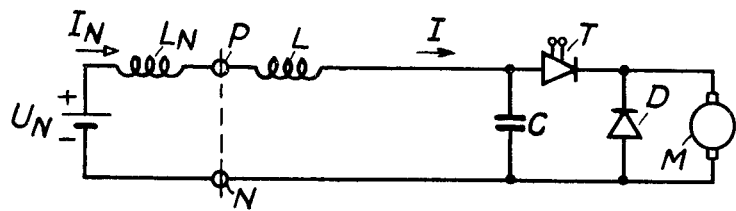
FIG. 1 shows, as already mentioned, a known DC convertor.
Figure 2:
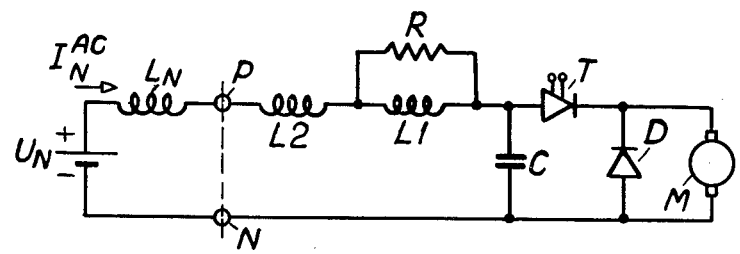
FIG. 2 shows a DC convertor according to the invention.

FIG. 2 shows a DC convertor according to the invention. It differs from the convertor according to FIG. 1 in that the inductor L is replaced by two inductors, L1 and L2. Furthermore, the inductor L1 is connected in parallel with a resistor R, which lowers the figure of merit (Q-value) of the filter circuit.

The DC convertor in FIG. 2 may, for example, be assumed to feed the driving motors in an electric locomotive for 3 kV supply voltage and 2 kA maximum current. Typical values of the circuit components are then $L_N = 0.2$ mH
$L1 = 8$ mH
$L2 = 0.6$ mH
$C = 3$ mF
$R = 1.3$ ohms The convertor is assumed to be controlled in a manner known per se so that, when the load voltage is increased from zero towards its maximum value, the pulse frequency is first increased from zero towards the maximum frequency with a constant pulse length which is equal to the shortest possible pulse length. When the maximum frequency has been achieved, the pulse length is increased (with a constant frequency) until full load voltage is obtained. As appears from the above description, it is the operating range with a low load voltage, that is with a minimum and constant pulse length and with a frequency varying between zero and a relatively low value, that is of interest in this case. In the following it is assumed that the pulse length in this range is 1 ms and the amplitude of the current pulses 500 A, that is each pulse contains the charge 0.5 As.

Figure 3:
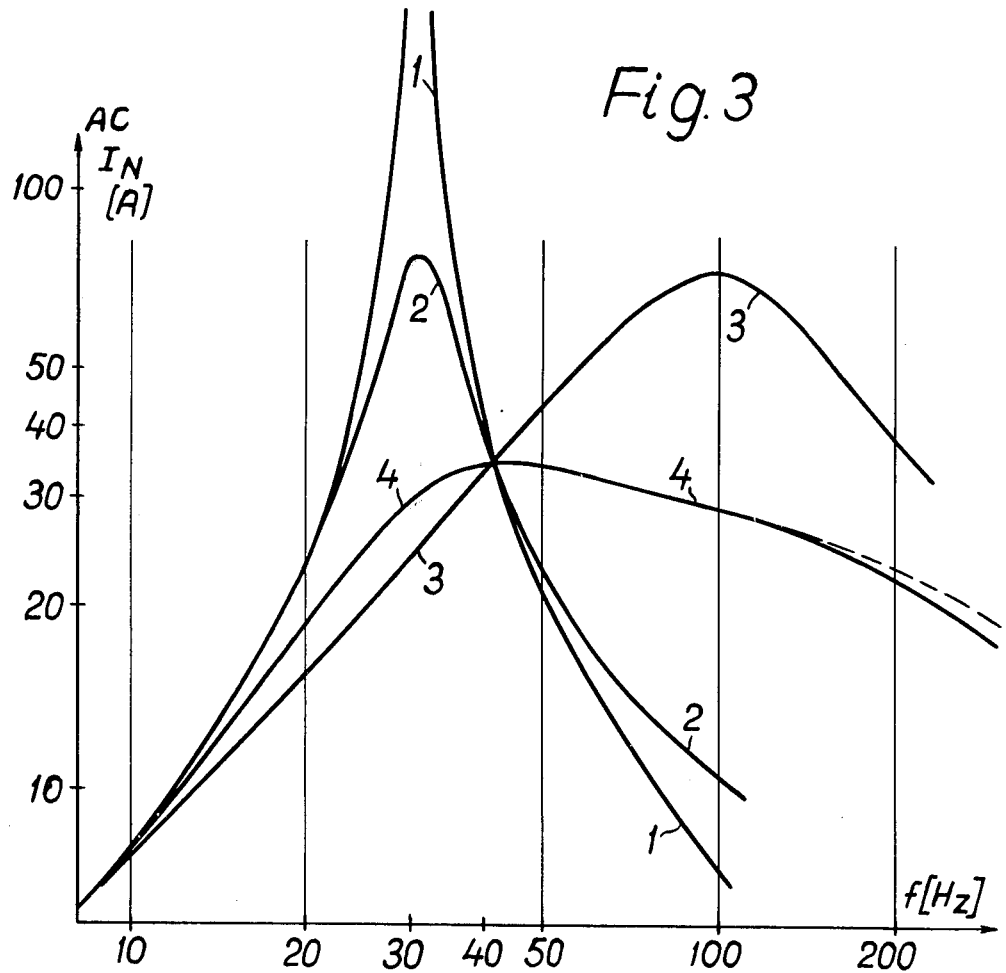
FIG. 3 shows the R.M.S. value of the AC component of the current drawn from the voltage source.

FIG. 3 shows the R.M.S. value of the fundamental tone in the AC component $I_N^{AC}$ of the current flowing from the source as a function of the pulse frequency for a few different cases.

The curve 1 shows the case when $R = \infty$, which corresponds to the previously known circuit according in FIG. 1 with $L = L2 + L1$. As can be seen, a very high alternating current is obtained at the resonance frequency (about 30 Hz). The series resistance of the circuit must be kept very low in order to prevent the high load current from causing prohibitive power loss and voltage drop, and in this way the figure of merit of the circuit will be high, which results in the high current peak at resonance frequency.

Curve 2 shows the alternating current for the case when $R = 5$ ohms. A considerable reduction of the current peak is obtained.

Curve 3 shows the case when $R = 0.5$ ohm, which is a low value. This means that the inductor L1 is almost short-circuited. The resonance frequency is therefore substantially determined by the sum of $L_N$ and L2 and will thus be considerably higher, about 100 Hz. The current peak will be approximately as high as in curve 2 but occurs at a higher pulse frequency.

Between the two extreme cases where R is large and where R is small there is an optimum value, where the current peak becomes as low as possible. In the example now described, the optimum value of R is about 1.3 ohms. The alternating current as a function of the frequency is shown for this resistance value in curve 4. As can be seen, the maximum alternating current in this case is only about 32 A as against 70 – 80 A in the curves 2 and 3 and the 200 – 300 A which is obtained in the previously known circuit according to FIG. 1 and curve 1. The reduction obtained with the help of the invention is thus in this case of the order of magnitude of ten and a corresponding reduction is obtained of the alternating voltage component across the capacitor C.

According to a preferred embodiment, the inductor L1 is arranged to become magnetically saturated at a value of the load current which is lower than the full rated load current. The current at which it becomes saturated should exceed the current which is obtained at a pulse frequency corresponding to the resonance frequency of the circuit with the inductor L1 saturated. In the example chosen above, this resonance frequency is around 100 Hz (it is determined by C and by the sum of $L_N$ and L2). L1 may then, for example, be designed so that it starts to become saturated when the frequency increases above 120 Hz, which corresponds to a direct current of 60 A. The curve 4 is insignificantly affected at pulse frequencies exceeding 120 Hz. Depending on the characteristic of L1's saturation, there is even obtained in the example a certain improvement of the filtering immediately above 120 Hz (the dashed-lined curve corresponding to an unsaturated inductor L1). This preferred embodiment has other advantages.

First of all, the rated power of the inductor L1 is reduced very strongly. In the typical case above, the rated power of L1 will be only 3% and the total rated power of L1 + L2 around 10% of what it would be if the inductor were to be unsaturated within the whole load current range. Since the inductor constitutes a considerable part of the price, weight and space-requirement of the whole DC convertor, this advantage is very important in practice.

Furthermore, the reactance of the inductor L1 increases with increasing pulse frequency. If the inductor does not become saturated, an increasingly greater part of the current would pass through the resistor R, which would give rise to greater losses. This disadvantage is avoided by arranging the current so that L1 becomes saturated at a relatively low current. When L1 has become saturated, it has a very low impedance and works in practice as a short-circuiting of the resistor R.

Since the damping of the filter circuit increases relatively rapidly with increased pulse frequency and current, the inductance of $L_N + L2$ can suitably be considerably lower than the inductance of L1. In the example chosen, it is 10% of the inductance of L1. The inductance of L2 may be chosen with consideration of the inductance $L_N$ of the supply source. If the latter inductance is sufficiently large the inductor L2 may be omitted. Particularly in vehicles supplied by means of a contact line, $L_N$ may vary strongly (with the distance from the supply station) and the inductance of L2 must be chosen with consideration of the lowest value of $L_N$ occurring.

Within the scope of the invention, the DC convertor can be designed in a great many different ways. Thus, the filter circuit may be provided with further impedance elements. Each inductor can of course consist of several parallel-or series-connected inductors, which (regarding L1) may become saturated at different current levels. The main circuits of the DC convertor, shown schematically in FIGS. 1 and 2, may also be constructed in many known ways. For example, they may comprise several parallel-connected main circuits which, synchronously or phase-displaced, feed separate loads or one common load.

I claim:

1. A DC convertor for supplying a load with direct voltage pulses with a variable frequency, said convertor having input terminals for connection to a DC supply network and comprising a main circuit and a filter circuit connected between said input terminals and said main circuit, said filter circuit comprising a capacitive parallel branch and a first series inductor connected between an input terminal and said capacitive parallel branch, a resistor for reduction of the Q-value of the filter circuit connected in parallel with said first series inductor; and said first series inductor being saturated at a value of the convertor load current which is lower than the rated load current.

2. A DC convertor according to claim 1, said filter circuit comprising a second series inductor, which is connected in series with the parallel connection of said first series inductor and said resistor.

3. A DC convertor according to claim 2, said first series inductor having an inductance which is, at least at low current values, larger than the inductance of said second inductor.

* * * * *